(12) United States Patent
Newton

(10) Patent No.: US 6,220,621 B1
(45) Date of Patent: Apr. 24, 2001

(54) ADJUSTABLE AND FOLDABLE STROLLER

(76) Inventor: Julie L. Newton, 1331 Stillwood Dr., Salt Lake City, UT (US) 84117

( * ) Notice: Subject to any disclaimer, the term of this patent is extended or adjusted under 35 U.S.C. 154(b) by 0 days.

(21) Appl. No.: 09/453,621

(22) Filed: Dec. 3, 1999

(51) Int. Cl.⁷ ................................................. B62B 1/00
(52) U.S. Cl. ............................................................ 280/650
(58) Field of Search ........................... 280/647, 648, 280/650, 47.131, 47.2, 47.24, 47.25, 47.315, 47.371, 47.38, 47.4, 79.2, 657, 658, 642

(56) References Cited

U.S. PATENT DOCUMENTS

| | | | |
|---|---|---|---|
| D. 355,874 | * | 2/1995 | Nelson ................................ D12/129 |
| 2,840,383 | * | 6/1958 | Coven et al. ........................... 280/41 |
| 3,887,208 | * | 6/1975 | Vidal ....................................... 280/36 |
| 4,191,397 | * | 3/1980 | Kassai .................................. 280/647 |
| 4,335,900 | * | 6/1982 | Fleischer ............................. 280/648 |
| 4,542,916 | * | 9/1985 | Kassai .................................. 280/642 |
| 5,201,535 | * | 4/1993 | Kato et al. ............................. 280/30 |
| 5,769,431 | * | 6/1998 | Cordova ................................. 280/1.5 |

FOREIGN PATENT DOCUMENTS

| | | | |
|---|---|---|---|
| 493316 | * | 6/1978 | (AU) ..................................... 280/650 |
| 1507446 | * | 1/1967 | (FR) ..................................... 280/647 |
| 413901 | * | 7/1945 | (IT) ....................................... 280/647 |

* cited by examiner

Primary Examiner—Brian L. Johnson
Assistant Examiner—M B Klebe

(57) ABSTRACT

A adjustable and foldable stroller for giving less-than-able adults mobility. The adjustable and foldable stroller includes first and second frames each having a support base member and a plurality of tubular support members attached to the support base member and further includes handle members each being telescopingly received in respective tubular support members, and also includes tubular leg members each having wheels attached thereto and each being telescopingly received in respective tubular support members, and further includes a seat member, a footrest member both made of fabric material and both being detachably attached to respective tubular support members, and further includes a tote bag which can be fastened to the stroller and can be carried on a user's back.

14 Claims, 3 Drawing Sheets

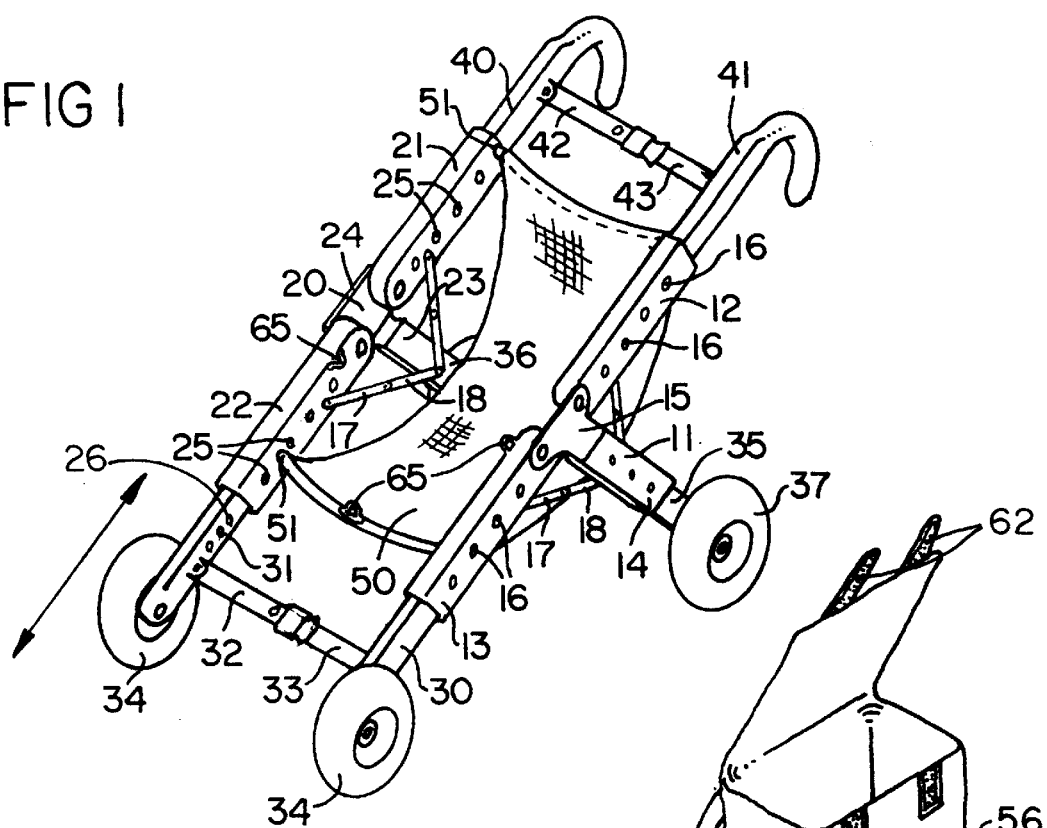
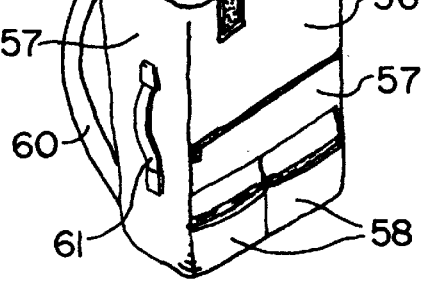
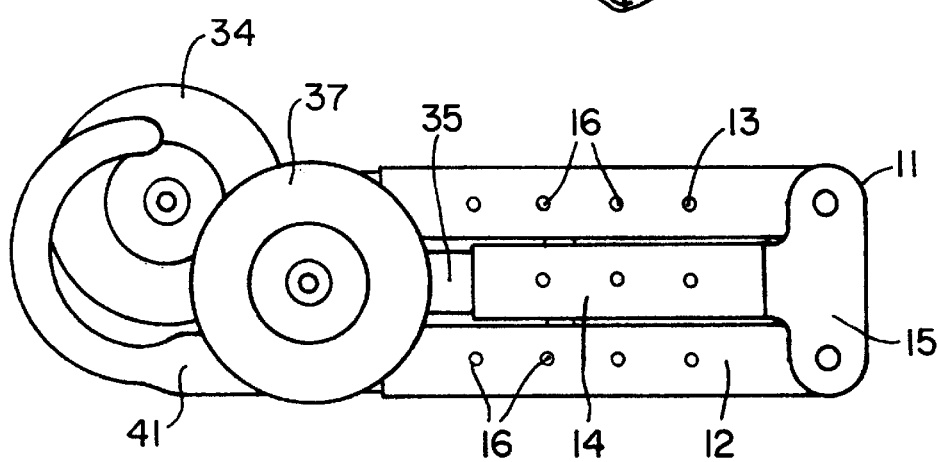

ADJUSTABLE AND FOLDABLE STROLLER

BACKGROUND OF THE INVENTION

1. Field of the Invention

The present invention relates to an adult carriage and more particularly pertains to a new adjustable and foldable stroller for giving less-than-able adults mobility.

2. Description of the Prior Art

The use of an adult carriage is known in the prior art. More specifically, an adult carriage heretofore devised and utilized is known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,335,900; U.S. Pat. No. 3,797,848; U.S. Pat. No. Des. 355,874; U.S. Pat. No. 5,058,912; U.S. Pat. No. 4,606,550; and U.S. Pat. No. 4,729,572.

While these devices fulfill their respective, particular objectives and requirements, the aforementioned patents do not disclose a new adjustable and foldable stroller. The inventive device includes first and second frames each having a support base member and a plurality of tubular support members attached to the support base member and further includes handle members each being telescopingly received in respective tubular support members, and also includes tubular leg members each having wheels attached thereto and each being telescopingly received in respective tubular support members, and further includes a seat member, a footrest member both made of fabric material and both being detachably attached to respective tubular support members, and further includes a tote bag which can be fastened to the stroller and can be carried on a user's back.

In these respects, the adjustable and foldable stroller according to the present invention substantially departs from the conventional concepts and designs of the prior art, and in so doing provides an apparatus primarily developed for the purpose of giving less-than-able adults mobility.

SUMMARY OF THE INVENTION

In view of the foregoing disadvantages inherent in the known types of an adult carriage now present in the prior art, the present invention provides a new adjustable and foldable stroller construction wherein the same can be utilized for giving less-than-able adults mobility.

The general purpose of the present invention, which will be described subsequently in greater detail, is to provide a new adjustable and foldable stroller which has many of the advantages of the adult carriage mentioned heretofore and many novel features that result in a new adjustable and foldable stroller which is not anticipated, rendered obvious, suggested, or even implied by any of the prior art an adult carriage, either alone or in any combination thereof.

To attain this, the present invention generally comprises first and second frames each having a support base member and a plurality of tubular support members attached to the support base member and further includes handle members each being telescopingly received in respective tubular support members, and also includes tubular leg members each having wheels attached thereto and each being telescopingly received in respective tubular support members, and further includes a seat member, a footrest member both made of fabric material and both being detachably attached to respective tubular support members, and further includes a tote bag which can be fastened to the stroller and can be carried on a user's back.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable and foldable stroller which has many of the advantages of the adult carriage mentioned heretofore and many novel features that result in a new adjustable and foldable stroller which is not anticipated, rendered obvious, suggested, or even implied by any of the prior art an adult carriage, either alone or in any combination thereof.

It is another object of the present invention to provide a new adjustable and foldable stroller which may be easily and efficiently manufactured and marketed.

It is a further object of the present invention to provide a new adjustable and foldable stroller which is of a durable and reliable construction.

An even further object of the present invention is to provide a new adjustable and foldable stroller which is susceptible of a low cost of manufacture with regard to both materials and labor, and which accordingly is then susceptible of low prices of sale to the consuming public, thereby making such adjustable and foldable stroller economically available to the buying public.

Still yet another object of the present invention is to provide a new adjustable and foldable stroller which provides in the apparatuses and methods of the prior art some of the advantages thereof, while simultaneously overcoming some of the disadvantages normally associated therewith.

Still another object of the present invention is to provide a new adjustable and foldable stroller for giving less-than-able adults mobility.

Yet another object of the present invention is to provide a new adjustable and foldable stroller which includes first and second frames each having a support base member and a plurality of tubular support members attached to the support base member and further includes handle members each being telescopingly received in respective tubular support members, and also includes tubular leg members each having wheels attached thereto and each being telescopingly received in respective tubular support members, and further includes a seat member, a footrest member both made of fabric material and both being detachably attached to respective tubular support members, and further includes a tote bag which can be fastened to the stroller and can be carried on a user's back.

Still yet another object of the present invention is to provide a new adjustable and foldable stroller that allows adults access to otherwise inaccessible places.

Even still another object of the present invention is to provide a new adjustable and foldable stroller that can be easily and conveniently folded up and placed in a tote bag which can be carried on a user's back.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new adjustable and foldable stroller according to the present invention.

FIG. 2 is a perspective view of the tote bag of the present invention particularly illustrating the front of the tote bag with the top in an open configuration.

FIG. 3 is a side elevational view of the present invention when folded up.

DESCRIPTION OF THE PREFERRED EMBODIMENT

Figure 4:
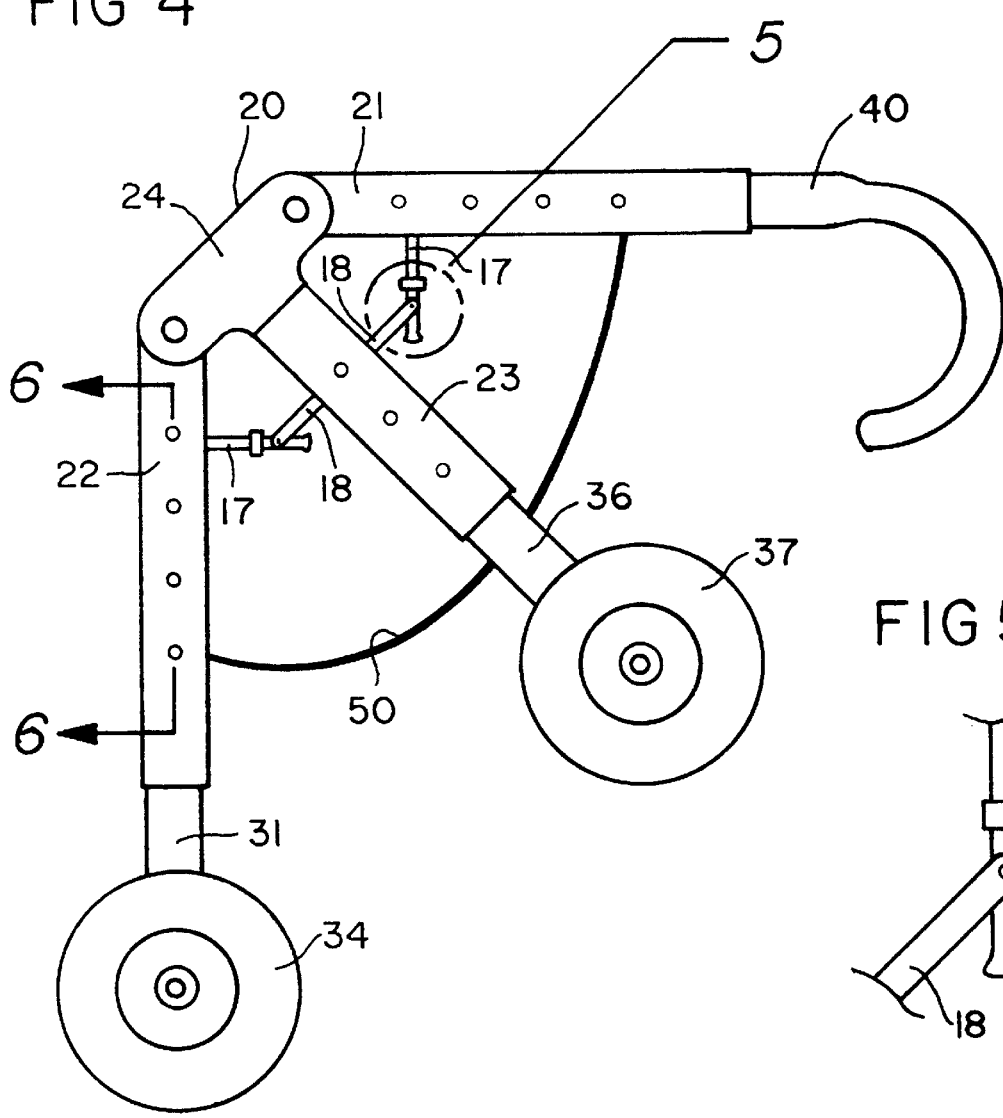
FIG. 4 is a detailed view of one of the frames of the present invention.
Figure 5:
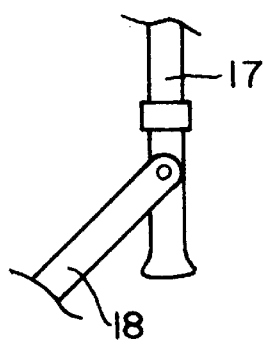
FIG. 5 is a detailed view of a first and second brace members of the present invention.
Figure 6:
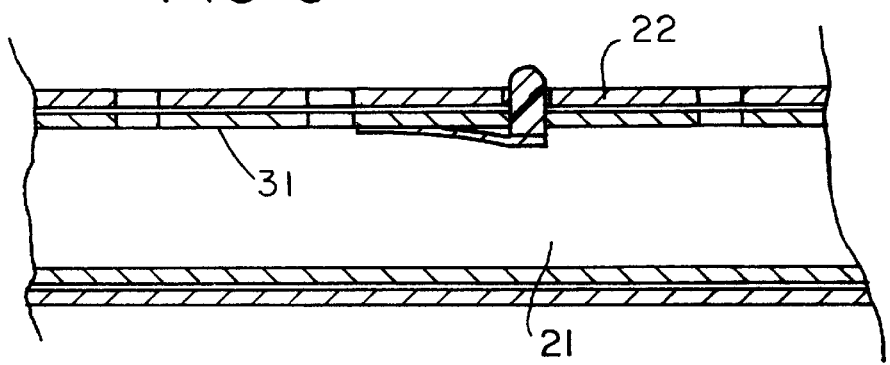
FIG. 6 is a another detailed view of a first and second brace member of the present invention.
Figure 7:
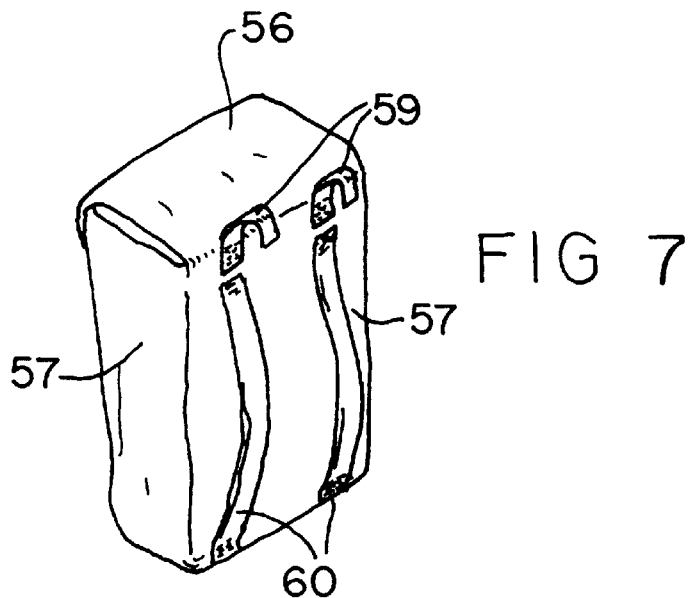
FIG. 7 is a perspective view of the tote bag of the present invention particularly illustrating the back of the tote bag with the top in a closed configuration.
Figure 8:
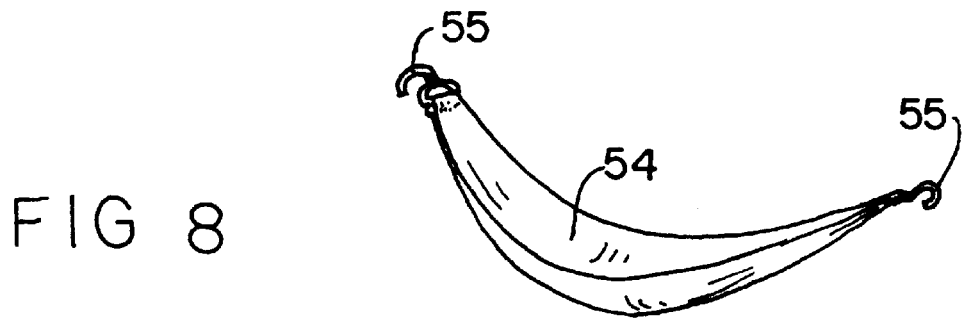
FIG. 8 is a perspective view of the seat member of the present invention.
Figure 9:
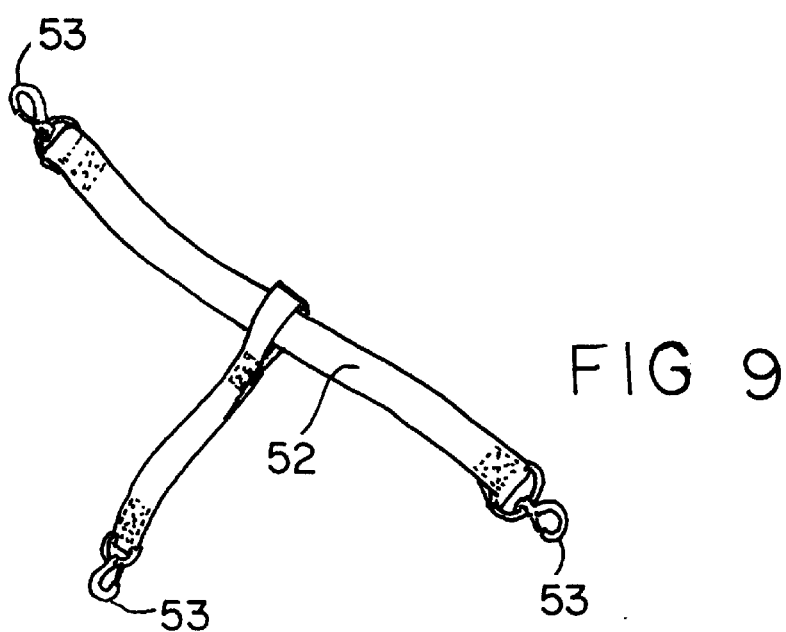
FIG. 9 is a perspective view of the seat belt of the present invention.

With reference now to the drawings, and in particular to FIGS. 1 through 9 thereof, a new adjustable and foldable stroller embodying the principles and concepts of the present invention and generally designated by the reference numeral 10 will be described.

As best illustrated in FIGS. 1 through 9, the adjustable and foldable stroller 10 generally comprises a first frame 11 having a support base member 15, a plurality of tubular support members 12–14 being securely attached to the support base member 15, and means for bracing the tubular members 12–14, and further includes a second frame member 20 having a support base member 24, a plurality of tubular members 21–23 being securely attached to the support base member 24, and means for bracing the tubular members 21–23, and also includes a handle means which includes a pair of handle members 40, 41 one being telescopingly received in one of the tubular members 12 of the first frame 11 and the other being telescopingly received in one of the tubular members 21 of the second frame 20. The handle means further includes a pair of cross members 42, 43 hingedly and fastenably attached to one another and interconnecting the pair of handle members 40, 41. The bracing means includes plurality of braces each of which includes a first brace member 17 and a second brace member 18 being hingedly and lockingly connected with a locking member to the first brace member 17. The first brace member 17 has an end which is securely and conventionally attached to a respective one of the tubular members 12, 13, 21, 22, and the second brace member 18 has an end which is also securely and conventionally attached to a respective one of the tubular members 14, 23. The tubular members include tubular handle support members 12, 21, tubular rear leg support members 14, 23, and tubular front leg support members 13, 22. Each of the tubular handle support members 12, 21 are hingedly attached at its closed end to a respective one of the support base members 15, 24, and each of the tubular front leg support members 13, 22 are hingedly attached at its closed end to a respective one of the support base members 15, 24. Each of the handle members 40, 41 includes a tubular portion which telescopingly extends in a respective one of the tubular handle support members 12, 21 and further includes a handle portion.

The adjustable and foldable stroller 10 also includes wheel means which includes a plurality of tubular front 30, 31 and rear 35, 36 leg members each of which is telescopingly received in a respective one of the tubular members 13, 14, 22, 23 and each of which has a wheel 34, 37 rotatably disposed at an outer end thereof. The wheel means further includes a pair of cross members 32, 33 hingedly and fastenably attached to one another. One of the cross members 32 has an end securely and conventionally attached to a first one of the tubular front leg members 31, and the other of the cross members 33 has an end securely and conventionally attached to a second one of the tubular front leg members 30. Each of the tubular members of the first 11 and second 20 frames includes a plurality of holes 16, 25 spaced therealong and extending through a wall thereof and further includes a closed end which is attached to a respective one of the support base members 15, 24 and also includes open end for receiving a respective one of the tubular leg members 30, 31, 35, 36 and handle members 40, 41. Each of the tubular front leg members 30, 31 is telescopingly received in a respective one of the tubular front leg support members 13, 22, and each of the tubular rear leg members 35, 36 is telescopingly received in a respective one of the tubular rear leg support members 14, 23.

In addition, the adjustable and foldable stroller 10 includes a seat means having a seat member 50 being detachably connected to the first and second frames 11, 20. The seat means includes a plurality of hooks 51 spaced apart and securely attached to the seat member 50. Each of the hooks 51 is attachable to a respective one of the tubular support members 12, 13, 21, 22 with the seat member 50 being adjustably attachable to the tubular handle support members 12, 21 and to the tubular front leg support members 13, 22. The hooks 51 are adjustably attachable to any of the holes 16 of the tubular handle support members 12, 21 and to the holes 25 in the tubular front leg support members 13, 22. Holes 26 are provided in the telescoping leg members 30, 31 and telescoping handle members 40, 41 for receiving hooks inserted in the holes 25 and 26. The seat member is made of fabric material.

A footrest means is detachably attached to the tubular front leg support members 13, 22 and includes a foot rest member 54 and a plurality of hook members 55 securely attached to the footrest member 54 and being detachably and adjustably connected to the tubular front leg support members 13, 22. The hook members 55 are attachable to any of the holes of the tubular front leg support members 13, 22. The foot rest member 54 is made of fabric material.

A tote bag 56 is used to store belongings and includes side walls 57, a bottom wall, a handle member 61 securely and conventionally attached to one of the side walls 57, a plurality of pockets 58 in one of the side walls, a plurality of fasteners 59 securely and conventionally attached at a top thereof for fastening the tote bag 56 to the handle means, of the foldable stroller 10. Ideally, the tote bag 56 is fastened at the pair of cross members 42, 43 of the handle means of the foldable stroller 10. Straps 60 on the tote bag 56 are securely and conventionally attached to a back side thereof for carrying the tote bag 56 on a person's back. A second pair of fasteners 62 may be attached to the top of the tote bag 56 for securing the top of the tote bag 56 to one of the side walls 57 of the tote bag. Additionally, the adjustable and foldable stroller 10 can include a seat belt 52 having hooks 53 at the ends thereof for attaching to eyelets 65 which are securely and conventionally attached to said tubular front leg support members 13, 22 and to said seat member 50.

In use, the adjustable and foldable stroller 10 can be folded up and placed in the tote bag 56 which can be carried on the user's back, and when needed, the user can unfold the stroller and secure it with the cross members and the brace members with the tote bag being fastened to the cross members of the handle means. Depending on the size of the user, the tubular legs members can be extended or shortened from the tubular support members to either make the stroller bigger or smaller as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claimed:

1. An adjustable and foldable stroller system comprising:
   a first frame having a support base member, a plurality of tubular members being securely attached to said support base member, and means for bracing said tubular members;
   a second frame member having a support base member, a plurality of tubular members being securely attached to said support base member, and means for bracing said tubular members;
   a handle means including a pair of handle members one being telescopingly received in one of said tubular members of said first frame and the other being telescopingly received in one of said tubular members of said second frame, said handle means further including a pair of cross members hingedly and fastenably attached to one another and interconnecting said pair of handle members;
   wheel means including a plurality of tubular front and rear leg members each of which is telescopingly received in a respective one of said tubular members and each of which has a wheel rotatably disposed at an outer end thereof;
   a seat means including a seat member being detachably connected to said first and second frames;
   a footrest means being detachably attached to said tubular front leg members;
   a tote bag having side walls, a bottom wall, a plurality of pockets in one of said side walls, a handle attached to one of said side walls, a plurality of fasteners securely attached at a top thereof for fastening to said handle means, and straps securely attached to a back side thereof for carrying said tote bag on a person's back;
   wherein each of said tubular members of said first and second frames includes a plurality of holes spaced therealong and extending through a wall thereof and further includes a closed end which is attached to a respective one of said support base members and also includes an open end for receiving a respective one of said tubular leg members and said handle members;
   wherein said tubular members includes tubular handle support members, tubular rear leg support members, and tubular front leg support members;
   wherein each of said tubular front leg members is telescopingly received in a respective one of said tubular front leg support members, and each of said tubular rear leg members is telescoping received in a respective one of said tubular rear leg support members; and
   wherein said wheel means further includes a pair of cross members hingedly and fastenably attached to one another, one of said cross members having an end securely attached to a first one of said tubular front leg members, and the other of said cross members having an end securely attached to a second one of said tubular front leg members.

2. An adjustable and foldable stroller as described in claim 1, wherein said bracing means includes a plurality of braces each of which includes a first brace member and a second brace member being hingedly and lockingly connected with a locking member to said first brace member.

3. An adjustable and foldable stroller as described in claim 2, wherein said first brace member has an end which is securely attached to a respective one of said tubular members, and said second brace member has an end which is also securely attached to a respective one of said tubular members.

4. An adjustable and foldable stroller system comprising:
a first frame having a support base member, a plurality of tubular members being securely attached to said support base member, and means for bracing said tubular members;
a second frame member having a support base member, a plurality of tubular members being securely attached to said support base member, and means for bracing said tubular members;
a handle means including a pair of handle members one being telescopingly received in one of said tubular members of said first frame and the other being telescopingly received in one of said tubular members of said second frame, said handle means further including a pair of cross members hingedly and fastenably attached to one another and interconnecting said pair of handle members;
wheel means including a plurality of tubular front and rear leg members each of which is telescopingly received in a respective one of said tubular members and each of which has a wheel rotatably disposed at an outer end thereof;
a seat means including a seat member being detachably connected to said first and second frames;
a footrest means being detachably attached to said tubular front leg members;
a tote bag having side walls, a bottom wall, a plurality of pockets in one of said side walls, a handle attached to one of said side walls, a plurality of fasteners securely attached at a top thereof for fastening to said handle means, and straps securely attached to a back side thereof for carrying said tote bag on a person's back;
wherein each of said tubular members of said first and second frames includes a plurality of holes spaced therealong and extending through a wall thereof and further includes a closed end which is attached to a respective one of said support base members and also includes an open end for receiving a respective one of said tubular leg members and said handle members;
wherein said tubular members includes tubular handle support members, tubular rear leg support members, and tubular front leg support members; and
wherein said seat means includes a plurality of hooks spaced apart and securely attached to said seat member, each of said hooks being attachable to a respective one of said tubular support members, said seat member being adjustably attachable to said tubular handle support members and to said tubular front leg support members.

5. An adjustable and foldable stroller as described in claim 4, wherein each of said tubular handle support members is hingedly attached at its closed end to a respective one of said support base members and each of said tubular front leg support members is hingedly attached at its closed end to a respective one of said support base members.

6. An adjustable and foldable stroller as described in claim 5, wherein each of said handle members includes a tubular portion which telescopingly extends in a respective one of said tubular handle support members and further includes a handle portion.

7. An adjustable and foldable stroller as described in claim 4, wherein each of said tubular front leg members is telescopingly received in a respective one of said tubular front leg support members, and each of said tubular rear leg members is telescopingly received in a respective one of said tubular rear leg support members.

8. An adjustable and foldable stroller as described in claim 4, wherein said hooks are adjustably attachable to any of said holes of said tubular handle support members and to said tubular front leg support members.

9. An adjustable and foldable stroller as described in claim 8, wherein said seat member is made of fabric material.

10. An adjustable and foldable stroller as described in claim 9, wherein said seat means includes a seat belt having hooks at the ends thereof for attaching to eyelets securely attached to said seat member and to said tubular front leg support members.

11. An adjustable and foldable stroller system comprising:
a first frame having a support base member, a plurality of tubular members being securely attached to said support base member, and means for bracing said tubular members;
a second frame member having a support base member, a plurality of tubular members being securely attached to said support base member, and means for bracing said tubular members;
a handle means including a pair of handle members one being telescopingly received in one of said tubular members of said first frame and the other being telescopingly received in one of said tubular members of said second frame, said handle means further including a pair of cross members hingedly and fastenably attached to one another and interconnecting said pair of handle members;
wheel means including a plurality of tubular front and rear leg members each of which is telescopingly received in a respective one of said tubular members and each of which has a wheel rotatable disposed at an outer end thereof;
a seat means including a seat member being detachably connected to said first and second frames;
a footrest means being detachably attached to said tubular front leg members; and
a tote bag having side walls, a bottom wall, a plurality of pockets in one of said side walls, a handle attached to one of said side walls, a plurality of fasteners securely attached at a top thereof for fastening to said handle means, and straps securely attached to a back side thereof for carrying said tote bag on a person's back.
wherein each of said tubular members of said first and second frames includes a plurality of holes spaced therealong and extending through a wall thereof and further includes a closed end which is attached to a respective one of said support base members and also includes an open end for receiving a respective one of said tubular leg members and said handle members;
wherein said tubular members includes tubular handle support members, tubular rear leg support members, and tubular front leg support members;
wherein said foot rest means includes a foot rest member and a plurality of hook members securely attached to said foot rest member and being detachably and adjustably connected to said tubular front leg support members.

12. An adjustable and foldable stroller as described in claim 11, wherein said hook members are adjustably attachable to any of said holes of said tubular front leg support members.

13. An adjustable and foldable stroller as described in claim 12, wherein said footrest member is made of fabric material.

14. An adjustable and foldable stroller system comprising:

a first frame having a support base member, a plurality of tubular members being securely attached to said support base member, and means for bracing said tubular members;

a second frame member having a support base member, a plurality of tubular members being securely attached to said support base member, and means for bracing said tubular members;

a handle means including a pair of handle members one being telescopingly received in one of said tubular members of said first frame and the other being telescopingly received in one of said tubular members of said second frame, said handle means further including a pair of cross members hingedly and fastenably attached to one another and interconnecting said pair of handle members, said bracing means including a plurality of braces each of which includes a first brace member and a second brace member being hingedly and lockingly connected with a locking member to said first brace member, said first brace member having an end which is securely attached to a respective one of said tubular members, and said second brace member having an end which is also securely attached to a respective one of said tubular members, said tubular members including tubular handle support members, tubular rear leg support members, and tubular front leg support members, each of said tubular handle support members being hingedly attached at its closed end to a respective one of said support base members and each of said tubular front leg support members being hingedly attached at its closed end to a respective one of said support base members, each of said handle members including a tubular portion which telescopingly extends in a respective one of said tubular handle support members and further includes a handle portion;

a wheel means including a plurality of tubular front and rear leg members each of which is telescopingly received in a respective one of said tubular members and each of which has a wheel rotatably disposed at an outer end thereof, said wheel means further including a pair of cross members hingedly and fastenably attached to one another, one of said cross members having an end securely attached to a first one of said tubular front leg members, and the other of said cross members having an end securely attached to a second one of said tubular front leg members, each of said tubular members of said first and second frames including a plurality of holes spaced therealong and extending through a wall thereof and further including a closed end which is attached to a respective one of said support base members and also including an open end for receiving a respective one of said tubular leg members and said handle members, each of said tubular front leg members being telescopingly received in a respective one of said tubular front leg support members, and each of said tubular rear leg members being telescopingly received in a respective one of said tubular rear leg support members;

a seat means including a seat member being detachably connected to said first and second frames, said seat means including a plurality of hooks spaced apart and securely attached to said seat member, each of said hooks being attachable to a respective one of said tubular support members, said seat member being adjustably attachable to said tubular handle support members and to said tubular front leg support members, said hooks being adjustably attachable to any of said holes of said tubular handle support members and to said tubular front leg support members, said seat member being made of fabric material, said seat means further including a seat belt having hook members at the ends thereof for attaching to eyelets securely attached to said tubular front leg support members and to said seat member;

a footrest means being detachably attached to said tubular front leg members, said footrest means including a foot rest member and a plurality of hook members securely attached to said footrest member and being detachably and adjustably connected to said tubular front leg support members, said hook members being adjustably attachable to any of said holes of said tubular front leg support members, said footrest member being made of fabric material; and a tote bag having side walls, a bottom wall, a plurality of pockets in one of said side walls, a handle member attached to one of said side walls, a plurality of fasteners securely attached at a top thereof for fastening to said handle means, and straps securely attached to a back side thereof for carrying said tote bag on a person's back.

\* \* \* \* \*